United States Patent
Zhang et al.

(10) Patent No.: US 10,809,937 B2
(45) Date of Patent: Oct. 20, 2020

(54) INCREASING THE SPEED OF DATA MIGRATION

(71) Applicant: International Business Machines Corporation, Armonk, NY (US)

(72) Inventors: Hui Zhang, Shanghai (CN); Bo Zou, Urumqi (CN); Yongjie Gong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 54 days.

(21) Appl. No.: 16/284,268

(22) Filed: Feb. 25, 2019

(65) Prior Publication Data

US 2020/0272352 A1    Aug. 27, 2020

(51) Int. Cl.
*G06F 3/06* (2006.01)
*G06F 12/0868* (2016.01)

(52) U.S. Cl.
CPC .......... *G06F 3/0649* (2013.01); *G06F 3/0608* (2013.01); *G06F 3/0616* (2013.01); *G06F 3/0631* (2013.01); *G06F 3/0644* (2013.01); *G06F 3/0653* (2013.01); *G06F 3/0659* (2013.01); *G06F 3/0685* (2013.01); *G06F 12/0868* (2013.01)

(58) Field of Classification Search
CPC .... G06F 3/0608; G06F 3/0616; G06F 3/0631; G06F 3/0644; G06F 3/0649; G06F 3/0653; G06F 3/0659; G06F 3/0685; G06F 12/0868
See application file for complete search history.

(56) References Cited

U.S. PATENT DOCUMENTS

| 6,145,066 | A  | 11/2000 | Atkin |
| 8,019,965 | B2 | 9/2011  | Agombar et al. |
| 8,958,253 | B2 | 2/2015  | Montgomery et al. |

(Continued)

FOREIGN PATENT DOCUMENTS

CN    105589664 A    5/2016

OTHER PUBLICATIONS

Anonymous, "A Method to Improve the Data Migration Speed of Storage System", An IP.com Prior Art Database Technical Disclosure, IP.com No. IPCOM000255074D, IP.com Electronic Publication Date: Aug. 29, 2018, 7 pages.

(Continued)

*Primary Examiner* — Larry T Mackall
(74) *Attorney, Agent, or Firm* — Daniel M. Yeates

(57) ABSTRACT

Disclosed is a computer-implemented method to increase the speed of extent migration. The method comprises determining a plurality of extents to migrate. The extents are stored in a source tier and the source tier is one tier of a tiered storage system. The method also comprises forming a first queue, wherein the first queue contains the plurality of extents to be migrated. The method further includes selecting a first extent to copy to a target tier. The copying comprises dividing the extent into a plurality of strides, forming a second queue containing the strides, selecting and copying the first stride, and removing the first stride from the second queue. The method further comprises changing a mapping table to point to the target tier, removing the first extent from the first queue, and releasing the first area of the first tier.

20 Claims, 9 Drawing Sheets

(56) References Cited

U.S. PATENT DOCUMENTS

| | | |
|---|---|---|
| 9,128,636 B2 | 9/2015 | Arakawa |
| 9,471,252 B2 | 10/2016 | Benhase et al. |
| 9,575,659 B2 | 2/2017 | Coronado et al. |
| 2008/0168228 A1* | 7/2008 | Carr .................... H04L 67/1097 711/117 |
| 2011/0202732 A1* | 8/2011 | Montgomery ........ G06F 3/0647 711/154 |
| 2012/0059994 A1 | 3/2012 | Montgomery et al. |

OTHER PUBLICATIONS

Mell et al., "The NIST Definition of Cloud Computing", Recommendations of the National Institute of Standards and Technology, Sep. 2011, 7 pages.

* cited by examiner

INCREASING THE SPEED OF DATA MIGRATION

BACKGROUND

The present disclosure relates to data migration, and, more specifically, to increasing the speed of extent migration from a source extent to a target extent.

Optimized data storage generally requires the use of a tiered storage system. Higher tiers are generally fast, small in capacity, and expensive. Lower tiers are generally slow, high capacity, and relatively inexpensive. Data can be placed in or moved between tiers based on inputs from a data owner, or automatically based on pre-programmed algorithms. The process of moving large chunks of data between tiers is generally known as extent migration. Extent migration is the building block for both manual and auto mode data migration.

SUMMARY

Disclosed is a computer-implemented method to increase the speed of extent migration. The method comprises determining a plurality of extents to migrate, wherein the extents are stored in a source tier and each extent occupies an area of the source tier, and the first tier is one tier of a tiered storage system. The method also comprises forming a first queue, wherein the first queue contains the plurality of extents to be migrated. The method further includes selecting, from the first queue, a first extent wherein the first extent occupies a first area of the first tier. The method also includes copying the first extent to a target tier, wherein the second tier is a tier in the tiered storage system. The copying comprises dividing the extent into a plurality of strides, where each stride is equal in volume, forming a second queue containing the plurality of strides, selecting and copying the first stride to the target tier, and removing the first stride from the second queue. The method further comprises, changing a volume mapping table to point to the target tier for the first extent, removing the first extent from the first queue, and releasing the first area of the first tier. A system and computer program product to carry out the above method is also disclosed.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
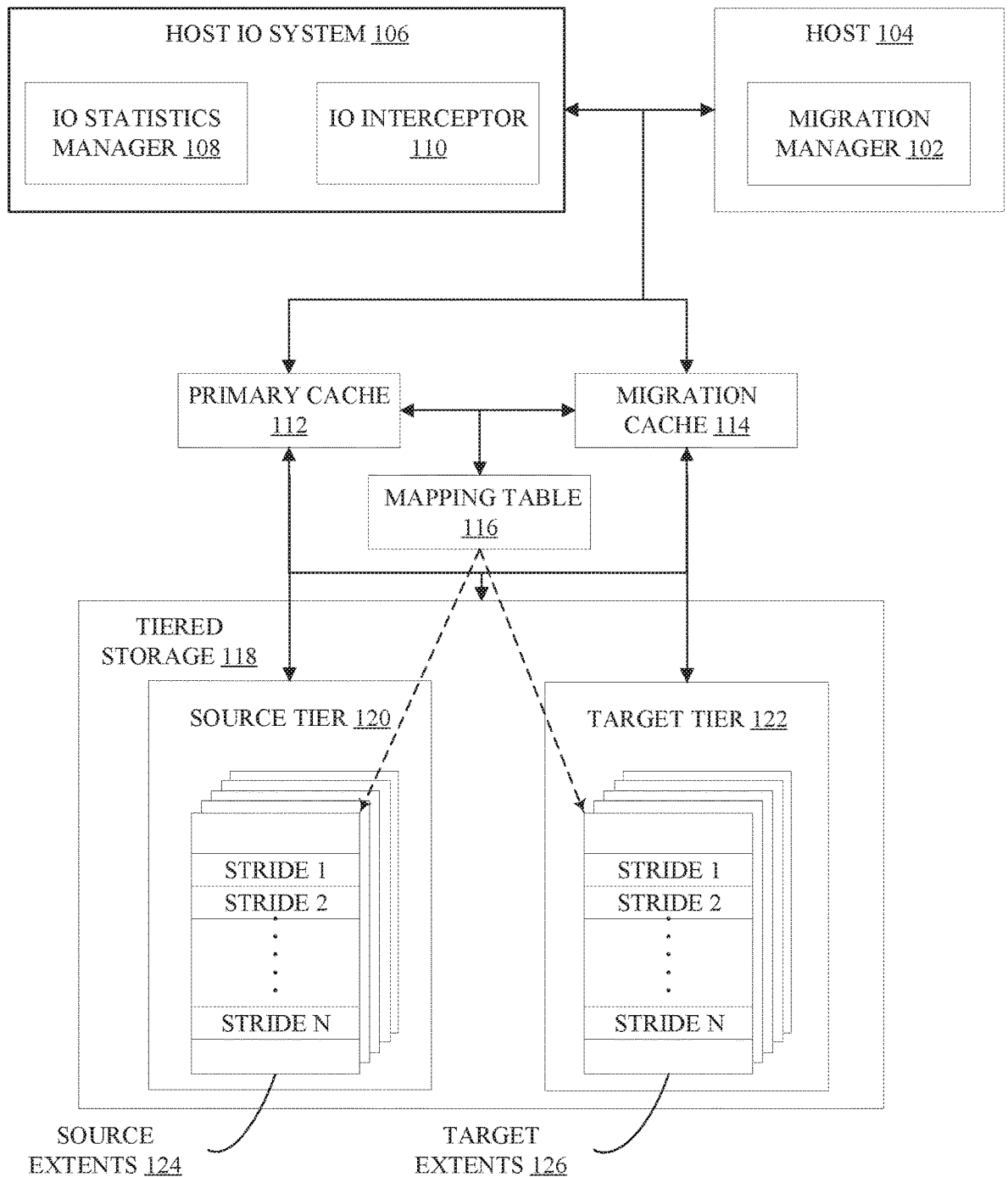
FIG. 1 illustrates a functional diagram of a computing environment suitable for operation of an example migration manager, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relates to data migration, and, more specifically, to increasing the speed of extent migration from a source tier to a target tier. Aspects of the present disclosure may be better appreciated in light of the aforementioned applications.

In many modern computing systems one or more processors working together can run multiple programs simultaneously. To execute a program, the processor, in simple terms, must first fetch the data to be processed, process the data per the instructions (e.g. code), then write the processed data to a storage location. An input/output driver (input/output system, IO driver, or IO system) can manage which data is processed first and attempt to optimize performance of the computing system.

The speed of central processing units ("CPU" or "CPU's") has increased to the point that in many cases the IO system becomes the limiting factor in overall computing system performance. This is because it takes longer to fetch and write data than it does to process the data. This is one reason for the development of an optimized data storage system.

Optimized data storage generally requires the use of a tiered storage system. The top tiers are generally fast, small in capacity, and expensive. Data that is likely to be used frequently can be stored in a faster tier. Lower tiers are slow, high capacity, and relatively inexpensive. Data that is infrequently used can be stored in slower tiers. (e.g. Solid-state drives can be higher tiers, and tape drives can be lower tiers). This can improve the overall efficiency of the system.

Data can be placed in or moved between tiers based on program instruction, system requirements, IO system algorithms, and/or manual inputs from the data owner. The process of moving large chunks of data between tiers is generally known as extent migration. Extent migration is the building block for both manual and auto mode data migration.

The increasing size of storage media and the amount of data being processed can lead to dwindling migration speed. An adequate migration speed is important in ensuring tiered storage systems work as designed. Attempting to migrate large chunks of data can cause a slow down in processing while all the data is fetched and copied, preventing other applications from performing their desired functions. Alternatively, the data can be contaminated (e.g., made dirty) during migration requiring the system to perform a duplicate migration.

Thus, embodiments of the present disclosure can increase the speed of extent migration, thereby increasing the overall efficiency of the system. Embodiments of the current disclosure can be used on tiered storage systems. In some embodiments, extent migration can be managed by a migration manager working in conjunction with the other processes being run on a computing device. In some embodiments, the speed is increased by reducing the amount of data that must be re-copied after becoming dirty.

For purposes of the present disclosure, the following terms can be as described. A rank or array includes a plurality of storage media of the same or similar type. For example, an array can be several hard disk drives (HDD) configured to store data as if they are a single storage device. An array can also include tape drives, solid state drives (SSD), flash storage, or other similar storage media.

In some embodiments an array can be divided into a number of extents. Each extent can be the same size across all the disks of the array. An extent can be the smallest unit for volumes of storage. Extents can vary in size based on the needs of the system. For example, a first system can have an extent size of 16 MB, and a second system can have an extent size of 1 GB.

In some embodiments, extents can be divided into a plurality of strides, or said differently, a number of continuous strides can form an extent. A track can be a number of continuous sectors or blocks in a disk or stride. A number of continuous tracks in the same disk makes a strip. A number of strips with the same logical block addressing (LBA) range from different disks (e.g. source extent and target extent) forms a stride. An LBA can be an address that shows which portion (or section, or area) of a disk is occupied by a segment (e.g. track) of data.

In some embodiments, an IO system can control which processes currently operating have priority. The IO system can prioritize the order in which data is processed. In some embodiments, the CPU and IO system utilize one or more caches to optimize processing speed. A cache is a storage medium that is generally faster and closer to the processor than long term storage. In some embodiments, a cache can be referred to as non-volatile system cache ("NVS"). Using the caches can save time by eliminating the need to fetch frequently or recently used data. In some embodiments the process of removing data from a cache is called destaging.

Destaging occurs when data is flushed from a cache to a back end storage medium. The IO system generally manages which data remains in which cache for how long. When the IO system determines that space in a cache is needed for another program, it will flush data out based on an algorithm. Categories of algorithms that can manage a cache can include, but are not limited to, least recently used (LRU), pseudo least recently used (PLRU), first in first out (FIFO), last in first out (LIFO), and variations on these or other algorithms known in the art. In some embodiments, destaging data of a stride that is partially copied can make the stride dirty and require the system to recopy that stride.

Embodiments of the present disclosure provide various methods to increase the speed of extent migration. In some embodiments, the speed is increased by reducing the amount of data that must be copied from the source to the target multiple times. In some embodiments, duplicate migration can occur when a stride becomes dirty during the migration process. A stride can become dirty when a track corresponding to the stride is destaged during the migration process. Once a stride becomes dirty, the data must be recopied thereby slowing the overall migration process.

In some embodiments, extent migration speed is increased by migrating the extents with the least number of tracks in the primary cache. The fewer tracks of data for a stride/extent that are in the primary cache, the less likely that one of them will be destaged. Using this technique, the stride/extent being copied is less likely to become dirty, and the system is less likely to have to duplicate the migration. This can result in faster migration times.

In some embodiments, extent migration speed is increased by dynamically altering the order in which strides or extents are copied. In some embodiments, the order in which data is copied can be changed based on tracks being written into or destaged from the primary cache. In some embodiments, the migration manager tracks IO statistics of how many tracks from each extent/stride are in a cache. In some embodiments, if the number of tracks in the cache falls below a predetermined threshold, then that extent can be moved up in the transfer queue. In some embodiments, if the number of tracks in the cache for an extent increases above a predetermined threshold, then that extent can be moved to the end of the queue. For example, assume there is a queue of 10 extents marked for migration. Extent 1 is $5^{th}$ in line and has 10 tracks in the cache. Extent 2 is $2^{nd}$ in line and has 3 tracks in the cache. In this example, assume that a first threshold of two tracks is set such that if any number of tracks in cache for a given extent falls below two, the corresponding extent is moved up in the transfer queue. Further assume that a second threshold of five tracks is set such that if any number of tracks in cache for a given extent exceeds five, the corresponding extent is moved down in the transfer queue. Following this example, if the IO system destages 9 tracks of Extent 1, one track remains in cache. Because there is only one track left in the cache, Extent 1 is advanced in the queue (e.g., to the front of the line), as the number of tracks for Extent 1 falls below the first threshold. In this example, if the IO system then writes three addition tracks from Extent 2 into the cache (bringing the number of tracks for Extent 2 above the second threshold), then the migration manager can move Extent 2 to toward the back of the queue.

In some embodiments, extent migration speed is increased by selecting which tracks to destage to avoid extents becoming dirty. In some embodiments, the migration manager can alter the IO algorithm and prevent a track from being destaged if the corresponding extent is in a migration state.

In some embodiments, extent migration speed is increased by intercepting IO system commands until an extent has fully migrated. Here, the migration manager can determine whether it would be more efficient overall to complete migration or to allow the IO to proceed. The IO can be intercepted (e.g. temporarily delayed), during which additional resources are allocated to the migration process. Once the migration is complete the intercepted commands are released. In some embodiments, if intercepted, the IO system commands can be released prior to a system timeout.

The aforementioned advantages are example advantages, and embodiments exist that can contain all, some, or none of the aforementioned advantages while remaining within the spirit and scope of the present disclosure.

Referring now to various embodiments of the disclosure in more detail, FIG. 1 is a representation of embodiments of a computing environment 100 configured to run a migration manager 102. FIG. 1 provides illustrations of one potential implementation and does not imply any limitation with regard to the environments in which different embodiments may be implemented. Many modifications of the depicted environment may be made by those skilled in the art without departing from the spirit and scope of the present disclosure.

Computing environment 100 includes host 104, host IO system 106, primary cache 112, migration cache 114, mapping table 116, and tiered storage 118.

Host 104 can be, for example, a standalone computing device, a management server, a web server, a mobile computing device, or any other electronic device or computing system capable of receiving, sending, and processing data. In some embodiments, host 104 can be one of many processors, or a portion of the computing device. In other embodiments, host 104 can represent a server computing system utilizing multiple computers, such as in a cloud computing environment. In some embodiments, host 104 represents a computing system utilizing clustered computers and components (e.g., database server computers, application server computers, etc.) that act as a single pool of seamless resources when accessed within computing environment 100. Host 104 may include internal and external hardware components, as depicted and described in further detail with respect to FIG. 7.

In some embodiments, host 104 can run migration manager 102. In some embodiments, host 104 can be in communication with one or more additional computing devices and receive instructions to perform the operations of migration manager 102. In some embodiments, host 104 can be electrically connected to and/or communicatively connected to host IO system 106, primary cache 112, migration cache 114, tiered storage 118, source tier 120, target tier 122, and/or other components (not shown) in computing environment 100.

Host IO system 106 can be any combination of hardware and/or software configured to manage the workload and throughput of one or more processors. In some embodiments host IO system 106 can include an IO driver. In some embodiments, host IO system 106 can manage the reading, writing and processing of all commands being processed by host 104. In some embodiments, host IO system 106 operates according to one or more algorithms that can be configured to prioritize certain tasks or programs. In some embodiments, migration manager 102 can influence operation of host IO system 106. In some embodiments, host IO system 106 can be electrically connected and/or communicatively connected to host 104, primary cache 112, migration cache 114, tiered storage 118, source tier 120, target tier 122, and/or other components (not shown) in computing environment 100.

In some embodiments, host IO system 106 can include IO statistics manager 108, and IO interceptor 110. IO statistics manager 108 can keep statistics on previous and pending actions. In some embodiments, IO statistics manager 108 can record which data is kept in various caches for how long. In some embodiments, IO statistics manager 108 can create a queue of tracks it will destage from various caches. In some embodiments, IO statistics manager 108 can determine system and/or cache utilization. Cache utilization is the percentage of space of a cache being utilized.

IO interceptor 110 can be any software and/or hardware component configured to temporarily intercept and store commands from host IO system 106. IO interceptor 110 may not delete or alter any commands, but rather allow certain processes to be completed before intercepted commands are processed. For example, if an extent is being copied, and the subsequent IO commands will cause the copies to become dirty, the commands can be intercepted until the extent is fully copied. In some embodiments, IO interceptor 110 can analyze various parameters to determine if intercepting IO commands will be beneficial for the computing system. In some embodiments, IO interceptor 108 can intercept commands when cache utilization is less than a predetermined threshold (e.g. 90%). In some embodiments, the threshold is tunable. In some embodiments, IO interceptor 108 can intercept commands when an estimated migration time T1 is less than a timeout value T2 for host IO system 106.

Primary cache 112 can be a storage medium used by host 104 and/or migration manager 102 to efficiently carry out program instructions. Generally, a cache is a fast but relatively small memory bank used to store frequently used data to decrease fetch and read times. In some embodiments, primary cache 112 can include more than one distinct caches configured to work with host 104. In some embodiments, primary cache 112 can wholly or partially include random access memory or RAM. In some embodiments, may be comprised of a read cache and a write cache. In some embodiments, the read cache is larger than the write cache. In some embodiments, the write cache may be referred to as non-volatile storage (NVS). In some embodiments, the write cache may include a battery. The battery may be configured to protect the data stored in the write cache, such that the data won't be lost if the rest of the system loses power. In some embodiments, primary cache 112 may service host IO system 106. It may be serviced by writing data to the write cache and then the data will destaged to backend storage asynchronously. Also, host IO system 106 can read data from the backend into the read cache, after a cache miss.

Migration cache 114 can be a storage medium used by host 104 and/or migration manager 102 that is used primarily for data migration. In some embodiments, migration cache 114 can be one or more cache systems. In some embodiments, migration cache 114 can be a portion of a cache (e.g. primary cache 112) dedicated to data migration processes.

Mapping table 116 can be a component that contains a directory of where data is stored. For example, when host 104 is fetching data, it can look in mapping table 116 to determine where in tiered storage 118 that particular data is stored. In some embodiments, mapping table 116 maintains the directory by using and changing metadata related to the location of data (e.g. LBA of an extent and which tier of tiered storage 118).

Tiered storage 118 can be any tiered storage system that includes at least two tiers. In some embodiments, each tier or tiered storage 118 includes one or more storage medium. For example, one tier could include 2 or more HDD's. In some embodiments, storage tiers can be cloud storage (public or private), tape drives, HDD, SAS drives, SSD, and any other storage medium known in the art. FIG. 1 depicts tiered storage 118 with source tier 120, and target tier 122. However, in some embodiments, tiered storage 118 can have additional tiers. In some embodiments tiered storage 118 can be configured to be used in a cloud computing environment. In some embodiments, tiered storage 118 can be in a cloud. In some embodiments, various tiers within tiered storage 118 can be located in different physical locations yet be interconnected through a cloud computing system.

In some embodiments, tiered storage 118 can be electrically connected to and/or communicatively connected to host 104, host IO system 106, primary cache 112, migration cache 114, and/or other components (not shown) in computing environment 100.

Source tier 120 can be any medium that can store data. In some embodiments, source tier 120 can be any of the storage mediums compatible with tiered storage 118. In some embodiments, source tier 120 has data that migration manager 102 is going to migrate to a different tier. Source tier 120 includes source extents 124. In some embodiments, source tier 120 is comprised of a plurality of extents of equal size. For example, if source tier 120 has a capacity of 1 TB there can be 1024 extents with a capacity of 1 GB, or 65,536 (1024*64=65,536) extents with a capacity of 16 MB. Source extents 124 can be divided into a plurality of strides.

Target tier 122 can be any medium that can store data. In some embodiments, target tier 122 can be any of the storage mediums compatible with tiered storage 118. In some embodiments, target tier 122 is receiving data that migration manager 102 is migrating from a different tier. Target tier 122 includes target extents 126. In some embodiments, target tier 122 is comprised of a plurality of extents of equal size. For example, if target tier 122 has a capacity of 1 TB there can be 1024 source extents with a capacity of 1 GB, or 65,536 (1024*64=65,536) target extents with a capacity of 16 MB. Target extents 126 can be divided into a plurality of strides.

In some embodiments, source tier 120 is a lower tier than target tier 122. In some embodiments, source tier 120 is a higher tier that target tier 122. In some embodiments, source tier 120 is in an equal tier, but a separate storage medium from target tier 122.

Figure 2:
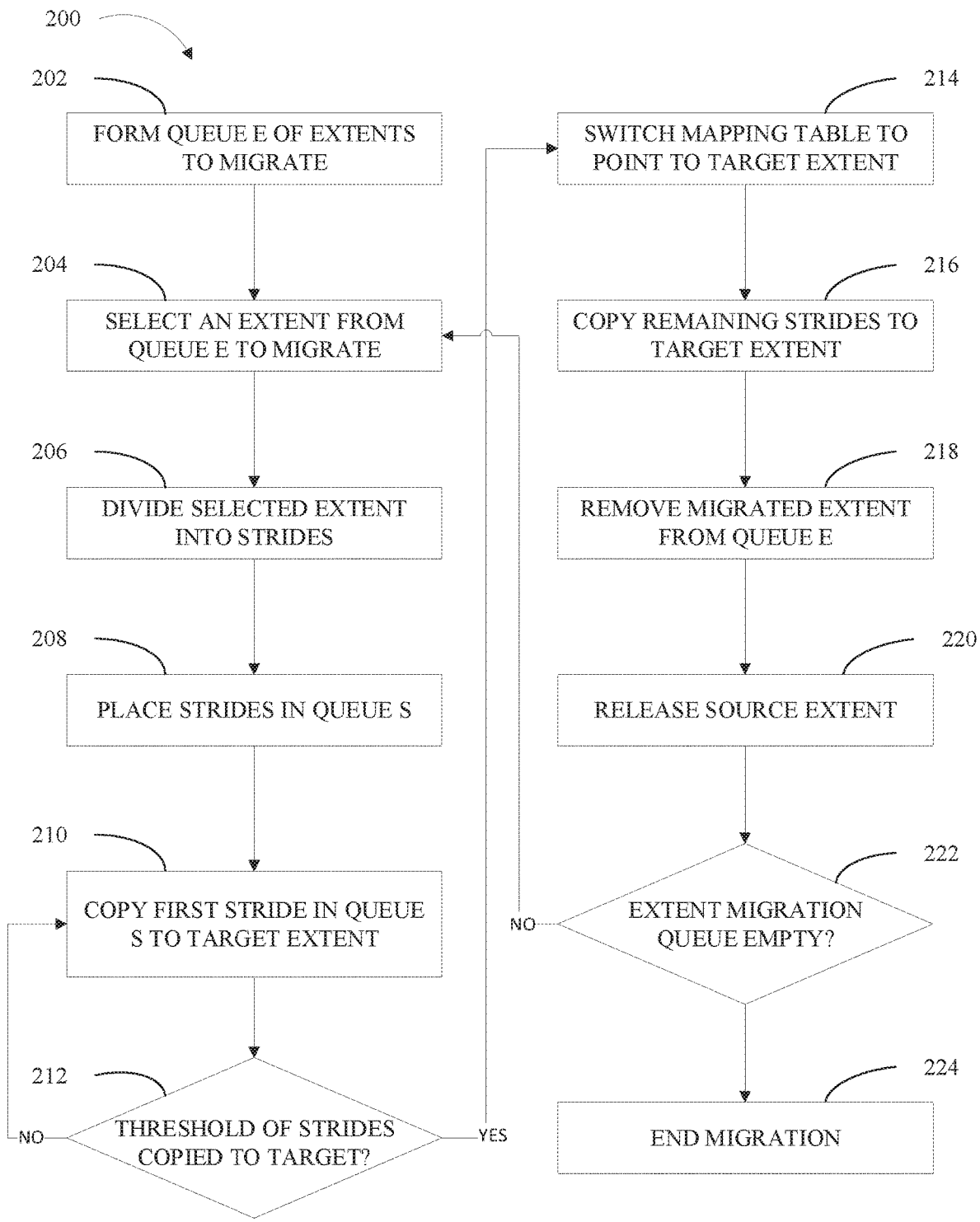
FIG. 2 is a flowchart depicting an example method of extent migration in accordance with some embodiments of the present disclosure.

FIG. 2 depicts a flowchart of an example extent migration that can be performed in a computing environment (e.g., computing environment 100 and/or migration manager 102). One or more of the advantages and improvements described above can be incorporated into FIG. 2 to increase the speed of extent migration consistent with some embodiments of the present disclosure.

Method 200 can include more or fewer operations than those depicted. Method 200 can include operations in different orders than the order depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, a migration manager (e.g., migration manager 102 of FIG. 1), a host (e.g., host 104 of FIG. 1), or a different combination of hardware and/or software. For clarity, the method 200 is described as being implemented by migration manager 102.

At operation 202, migration manager 102 forms a queue of extents to migrate. In some embodiments, the queue formed is queue E. In some embodiments, the extents in queue E are source extents 124. In some embodiments, all extents marked for migrations are placed in queue E.

In some embodiments, the queue is formed based on an input from a user to migrate extents between tiers. In some embodiments, the queue is formed based on an automatic process. In some embodiments, the automatic process is a result of host 104 starting a new program or terminating a program. In some embodiments, the automatic process is based on input from host IO system 106. In some embodiments, host IO system 106 can determine extents should be migrated based on a predetermined algorithm or based on system efficiency. For example, if the system determines source extents will likely not be processed for an extended period of time, it may determine to migrate them to a lower tier. Alternatively, if the system determines data will be frequently processed in the future, it can determine to migrate those extents to a higher tier.

At operation 204, migration manager 102 selects a source extent 124 from queue E to migrate. In some embodiments, migration manager selects the extent to migrate based on a position in the queue E. In some embodiments, migration manager 102 selects the extent to migrate based on a location of the extent in source tier 120 (e.g. the LBA address). In some embodiments, migration manager 102 selects the extent to migrate based on the storage location in the target tier 122. In some embodiments, migration manager 102 selects the extent to migrate based on receiving inputs from host IO system 106.

At operation 206, migration manager 102 divides the selected extent in into strides. At operation 208, migration manager 102 places the strides a stride queue, queue S.

At operation 210, migration manager 102 copies the first stride in queue S from source extent 124 to target extent 126. In some embodiments, the stride is copied using migration cache 114. In some embodiments, the stride is written into target tier 122 from the write cache. For example, the data is fetched from source extent 124, and written into migration cache 114. Then the data is read from migration cache 114 and written into target extent 126. In some embodiments, the stride is copied using remote direct memory access ("RDMA"). RDMA is a direct memory access from one storage device into that of another without involving an operating system.

At operation 212, migration manager 102 determines if a predefined threshold of the strides in queue S are copied to target. In some embodiments, the threshold can be a percentage of strides copied. In some embodiments, the threshold can be a majority of strides copied.

If the threshold is not met (decision tree "NO" branch), migration manager 102 removes the copied stride from queue S and returns to step 210. If the threshold is met (decision tree "YES" branch), migration manager 102 proceeds to operation 214.

At operation 214, migration manager 102 directs mapping table 116 to point to target extent 126. In some embodiments, mapping table 116 points to target extent 126 by updating metadata. In some embodiments, operation 214 may include intercepting all commands to destage. Intercepting the destage commands will prevent the remaining strides in queue S from being made dirty. In some embodiments, the commands are intercepted by IO interceptor 110.

At operation 216, migration manager 102 copies the remaining strides in queue S to target extent 126. At operation 218, migration manager 102 removes the copied extent from queue E. In some embodiments, operation 218 may include releasing the intercepted destage commands. In these embodiments, the strides will be destaged to target tier 122, vice source tier 120, thereby preventing the strides from being recopied.

At operation 220, migration manager 102 releases source extent 124. Once released, any system such as host 104, host IO system 106, or migration manager 102 can allocate source extent 124 to store different data.

At operation 222, migration manager 102 determines if queue E is empty. If queue E is not empty (decision tree "NO" branch), migration manager 102 returns to operation 204 and selects the next extent to migrate. If queue E is empty (decision tree "YES" branch), migration manager 102 proceeds to operation 224. At operation 224, migration manager 102 ends the migration process.

Figure 3:
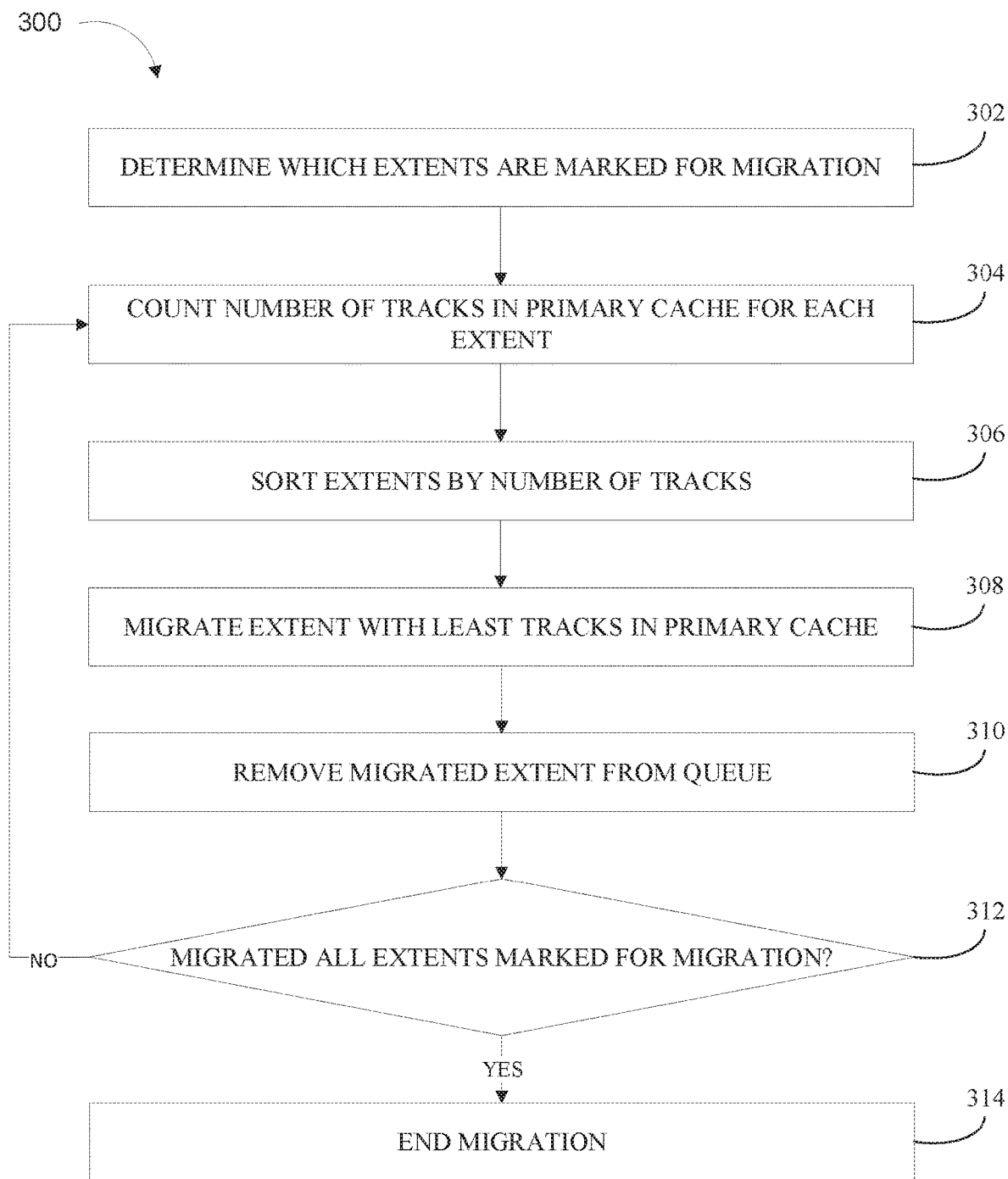
FIG. 3 is a flowchart depicting an example method of selecting an extent to migrate in accordance with some embodiments of the present disclosure.

FIG. 3 depicts a flowchart of an example method to increase the speed of extent migration by selecting which extent to migrate first. One or more of the advantages and improvements described above can be incorporated into FIG. 3 to increase the speed of extent migration consistent with some embodiments of the present disclosure.

Method 300 can include more or fewer operations than those operations that are depicted. Method 300 can include operations in different orders than those orders depicted. Likewise, the method 300 can include operations that occur simultaneously rather than sequentially. Many modifications to the depicted method may be made by those skilled in the art without departing from the spirit and scope of the present disclosure. Method 300 can be implemented by one or more processors, migration manager 102, or host 104 of FIG. 1, or a different combination of hardware and/or software. In some embodiments, method 300 can be combined with method 200. In some embodiments, portions of method 300 and portions of methods 200, 400, 500, and/or 600 can be combined.

At operation 302, migration manager 102 determine which extents are marked for migration. In some embodiments, migration manager 102 can determine which extents are marked for migration by checking queue E. In some embodiments, migration manager 102 determines which extents are marked for migration by forming queue E. In some embodiments, operation 302 can include the same functions as operation 202 of method 200. At operation 304, migration manager 102 determines, for each extent in queue E, the number of tracks stored in a cache. In some embodiments, the cache can be primary cache 112. At operation 306, migration manager 102 sorts extents based on the number of tracks. In some embodiments, migration manager 102 sorts the extent from the smallest number of tracks to the highest number tracks. In some embodiments, migration manager 102 sorts the tracks by changing the order of queue E based on the number of tracks.

At operation 308, migration manager 102 migrates the extent with the least number of tracks. In some embodiments, the extent with the least number of tracks is the first extent in queue E. In some embodiments, the extent with the least number of tracks is in the middle of queue E. In some embodiments, the extent with the least number of tracks is at the end of queue E. In some embodiments, migration manager 102 migrates the extent in the same manner as some operations of method 200 (e.g. operations 206-220 of method 200)

At operation 310, migration manager 102 removes the migrated extent from the queue (e.g. queue E). In some embodiments, migration manager 102 removes the extent from the queue consistent with operation 218 of method 200.

At operation 312, migration manager 102 determines if all marked extents have been migrated. If all extents marked for migration have been migrated (decision tree "YES" branch), migration manager 102 proceeds to operation 314. At operation 314, migration manager 102 ends the migration process.

If all extents marked for migration have not been migrated (decision tree "NO" branch), migration manager 102 returns to operation 304. In some embodiments, migration manager 102 can count the number of tracks after each extent is migrated. In some embodiments, migration manager 102 counts the tracks once. In those embodiments, migration manager 102 would return operation 308 (not shown) to operation 304. In some embodiments, migration manager 102 counts the number of extents after a predetermined threshold. The threshold can be a time, (e.g. every 15 seconds), a number of extents (e.g. after 2 extents are migrated), a percentage (e.g. after 10% of queue E is migrated), based on inputs from host IO system 106 (e.g. a number of clock cycles), or other similar parameter.

Figure 4:
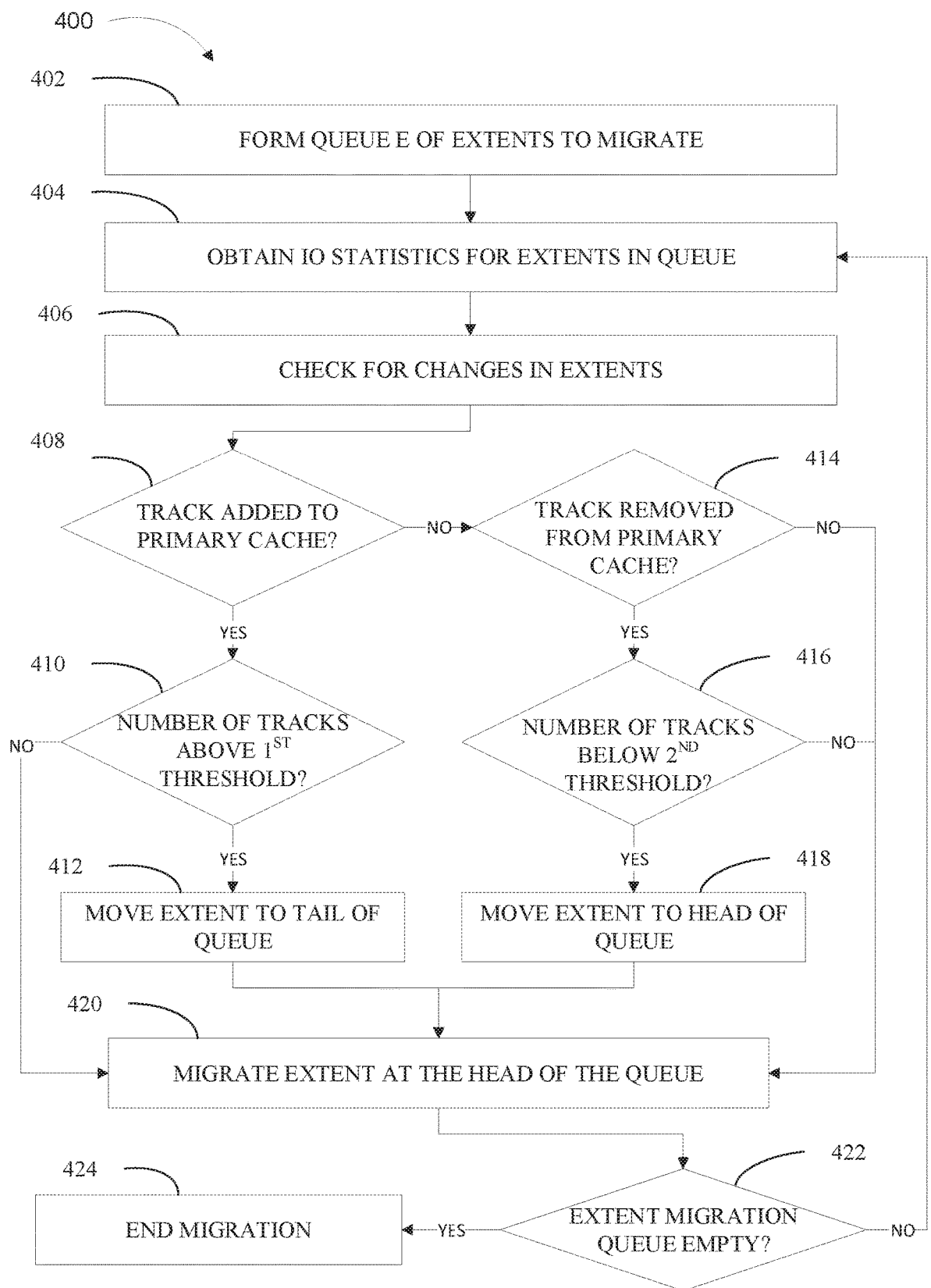
FIG. 4 is a flowchart depicting an example method of adjusting an extent migration queue in accordance with some embodiments of the present disclosure.

FIG. 4 depicts a flowchart of an example method to increase the speed of extent migration by selectively adjusting the queue E based on changes in the primary cache 112. One or more of the advantages and improvements described above can be incorporated into FIG. 4 to increase the speed of extent migration consistent with some embodiments of the present disclosure.

Method 400 can include more or fewer operations than those operations that are depicted. Method 400 can include operations in different orders than those orders depicted. Likewise, the method 400 can include operations that occur simultaneously rather than sequentially. Many modifications to the depicted method may be made by those skilled in the art without departing from the spirit and scope of the present disclosure. Method 400 can be implemented by one or more processors, migration manager 102, or host 104 of FIG. 1, or a different combination of hardware and/or software. In some embodiments, method 400 can be combined with method 200. In some embodiments, portions of method 400 and portions of methods 200, 300, 500, and/or 600 can be combined.

At operation 402, migration manager 102 forms a queue E of extents to migrate. In some embodiments, operation 402 can be consistent with operation 202 of method 200. At operation 404, migration manager 102 obtains IO statistic data extents in queue E. In some embodiments the IO statistics data is obtained from IO statistics manager 108. In some embodiments, IO statistic data includes what data is filling primary cache 112 and/or migration cache 114. For example, it can include how many tracks and which portions of source extents 124 are currently written into primary cache 112. In some embodiments, the IO statistics include information relating to historical number of tracks in a cache for a particular extent. In some embodiments, migration manager 102 can perform each operation of method 400 on each extent prior to proceeding to the next operation.

In some embodiments, IO statistics includes data relating to the amount of time a track has been held in a cache. In some embodiments, IO statistics information can include information relating to which portions of the cache will be destaged in what order. For example, if the cache uses an LRU algorithm, the IO statistics can include data relating to how long ago a track has been used. In some embodiments, the IO statistics data includes the time the data was obtained. The times can be used to determine changes and/or rate of change from previous and subsequent queries.

At operation 406, migration manager 102 checks for changes in IO statistics for extents in queue E. In some embodiments, operation 406 occurs prior to any extents being migrated. In some embodiments, operation 406 occurs after an extent has been migrated and/or removed from queue E.

At operation 408, migration manager 102 determines if a track from an extent in queue E has been added to the cache. In some embodiments, migration manager 102 determines if a track has been added to the cache based on the findings of operation 406. To have a track added can mean a net increase in the number of tracks for an extent. For example, if three tracks were added and two destaged, there would be an increase of one. Migration manager 102 can consider that one additional track was added to the cache.

If no track was added to the cache (decision tree "NO" branch), migration manager 102 proceeds to operation 414 (discussed below). If a track from an extent marked for migration was added to the cache (decision tree "YES" branch), migration manager 102 proceeds to operation 410.

At operation 410, migration manager 102 determines if the number of tracks is above a first (or high, or maximum) threshold. In some embodiments, the first threshold can be predetermined. In some embodiments, the first threshold can be a number or tracks, a percentage of the extent, or other similar parameter. In some embodiments, the first threshold can be dynamic. For example, the first threshold can change based on the number of extents in the queue, or on the overall system usage. In some embodiments, the first threshold can be a relative value. For example, if the extent has more tracks than 80% of the extents in queue E, it could be above the first threshold. Any other similar parameter can be used as the basis for the first threshold.

If the number of tracks does not rise above the first threshold (decision tree "NO" branch), then migration manager 102 proceeds to operation 420. At operation 420, migration manager 102 migrates the extent at the head of queue E. In some embodiments, the migration can be consistent with the migration process of method 200.

Returning to operation 410, if the number of tracks does rise above the first threshold (decision tree "YES" branch), then migration manager 102 proceeds to operation 412.

At operation 412, migration manager 102 moves the extent to the tail of queue E. Since there are more tracks in primary cache 112, the probability that a track will be destaged while being copied increases. Thus, the probability that stride being copied will become dirty and have to be recopied taking up more time and resources also increases. After operation 412, migration manager 102 proceeds to operation 420. At operation 420, migration manager 102 migrates the extent at the head of the queue, as previously discussed.

At operation 414, migration manager migration manager 102 determines if a track from an extent in queue E has been removed from the cache. In some embodiments, migration manager 102 determines if a track has been added to the cache based on the findings of operation 406. In some embodiments, tracks have been removed if there is a net loss of tracks from the cache, (consistent with operation 408).

If it is determined no track for the extents in queue E were not removed from the cache (decision tree "NO" branch), migration manager 102 proceeds to operation 420. If it is determined tracks for the extents in queue E were removed from the cache (decision tree "YES" branch), migration manager 102 proceeds to operation 416.

At operation 416, migration manager 102 determines if the number of tracks for an extent falls below a second (or low or minimum) threshold. The second threshold can be determined consistent with the second threshold of operation 410, except attention is made to decreasing tracks rather than increasing.

If the number of tracks does not fall below the second threshold (decision tree "NO" branch), then migration manager 102 proceeds to operation 420. At operation 420, migration manager 102 migrates the extent at the head of queue E. In some embodiments, the migration can be consistent with migration process of method 200.

If the number of tracks does fall below the second threshold (decision tree "YES" branch), then migration manager 102 proceeds to operation 418.

At operation 418, migration manager 102 moves the extent to the head of the queue. When an extent has a small number of tracks in primary cache 112, there is a small likelihood of the strides becoming dirty. Accordingly, prioritizing the migration can limit the amount of data that needs to be re-migrated.

After completing of operation 418, migration manager 102 proceeds to operation 420. At operation 420, migration manager 102 migrates the extent at the head of queue E. In some embodiments, the migration can be consistent with migration process of method 200.

At operation 422, migration manager 102 determines if queue E is empty. If it is determined queue E is not empty (decision tree "NO" branch), migration manager 102 returns to operation 404. If it is determined queue E is empty (decision tree "YES" branch), migration manager 102 proceeds to operation 424. At operation 424, migration manager 102 ends the migration process.

Figure 5:
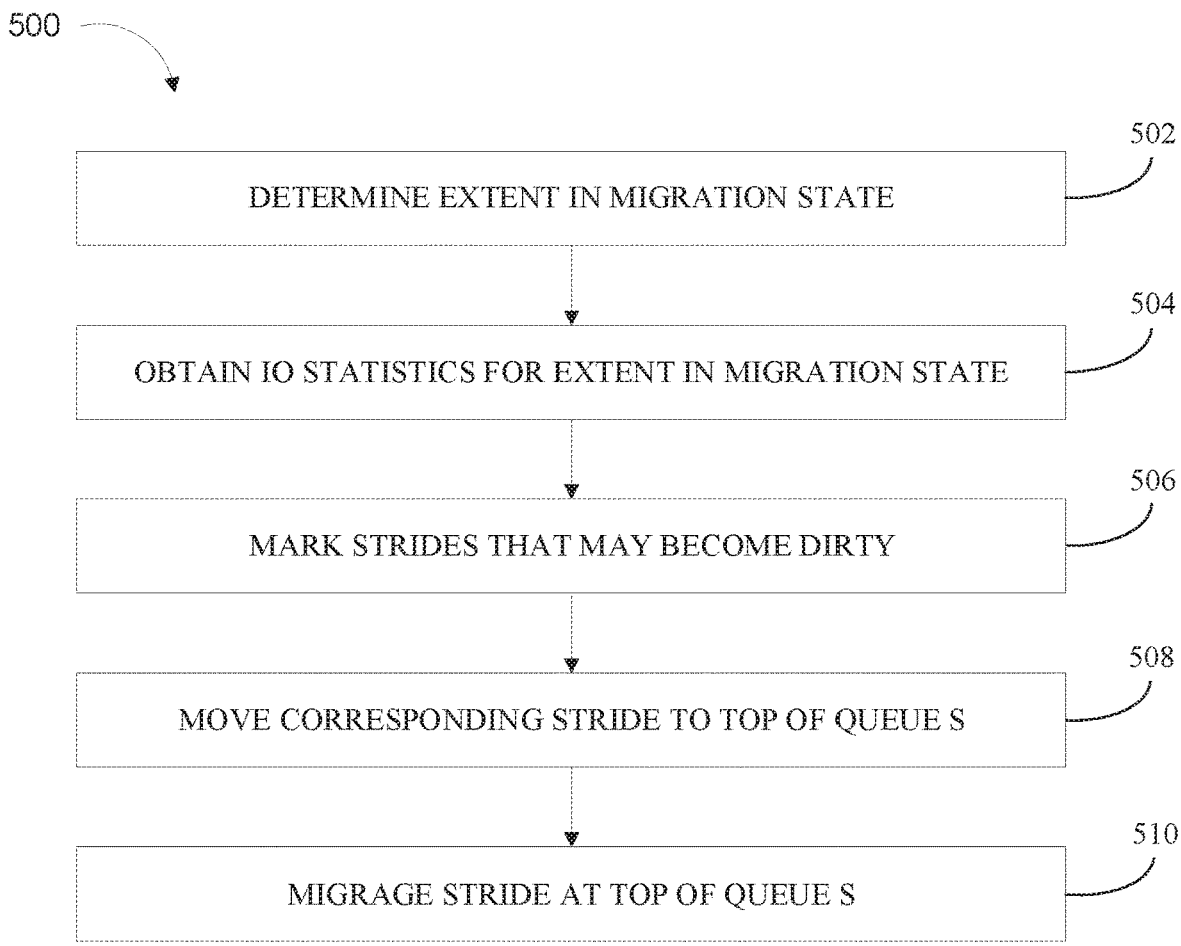
FIG. 5 is a flowchart depicting an example method of selecting which stride to migrate in accordance with some embodiments of the present disclosure.

FIG. 5 depicts a flowchart of an example method to increase the speed of extent migration by adjusting the queue S based on host IO system 106 destaging queue. One or more of the advantages and improvements described above can be incorporated into FIG. 5 to increase the speed of extent migration consistent with some embodiments of the present disclosure.

Method 500 can include more or fewer operations than those operations that are depicted. Method 500 can include operations in different orders than those orders depicted. Likewise, the method 500 can include operations that occur simultaneously rather than sequentially. Many modifications to the depicted method may be made by those skilled in the art without departing from the spirit and scope of the present disclosure. Method 500 can be implemented by one or more processors, migration manager 102, or host 104 of FIG. 1, or a different combination of hardware and/or software. In some embodiments, method 500 can be combined with method 200. In some embodiments, portions of method 500 and portions of methods 200, 300, 400, and/or 600 can be combined.

At operation 502, migration manager 102 determines which extent is in a migration state. In some embodiments, an extent in a migration state can be an extent currently being migrated from source tier 120 to target tier 122.

At operation 504, migration manager 102 obtains IO statistics for the extent in a migration state. In some embodiments, the IO statistics are obtained from IO statistics manager 108. In some embodiments, the IO statistics includes information relating to strides that are dirty. In some embodiments, the IO statistics includes information relating to which tracks will be destages, which relates to which strides may become dirty. At operation 506, migration manager 102 marks the strides that may become dirty. In some embodiments, a stride may become dirty if host IO system 106 has the stride in a destaging queue. In some embodiments, the stride may become dirty if it is in a cache.

At operation 508, migration manager 102 moves marked strides to the top of queue S. At operation 510, migration manager 102 migrates the stride at the top of queue S. In some embodiments, migrating the stride can be consistent with operation 210 of method 200.

Figure 6:
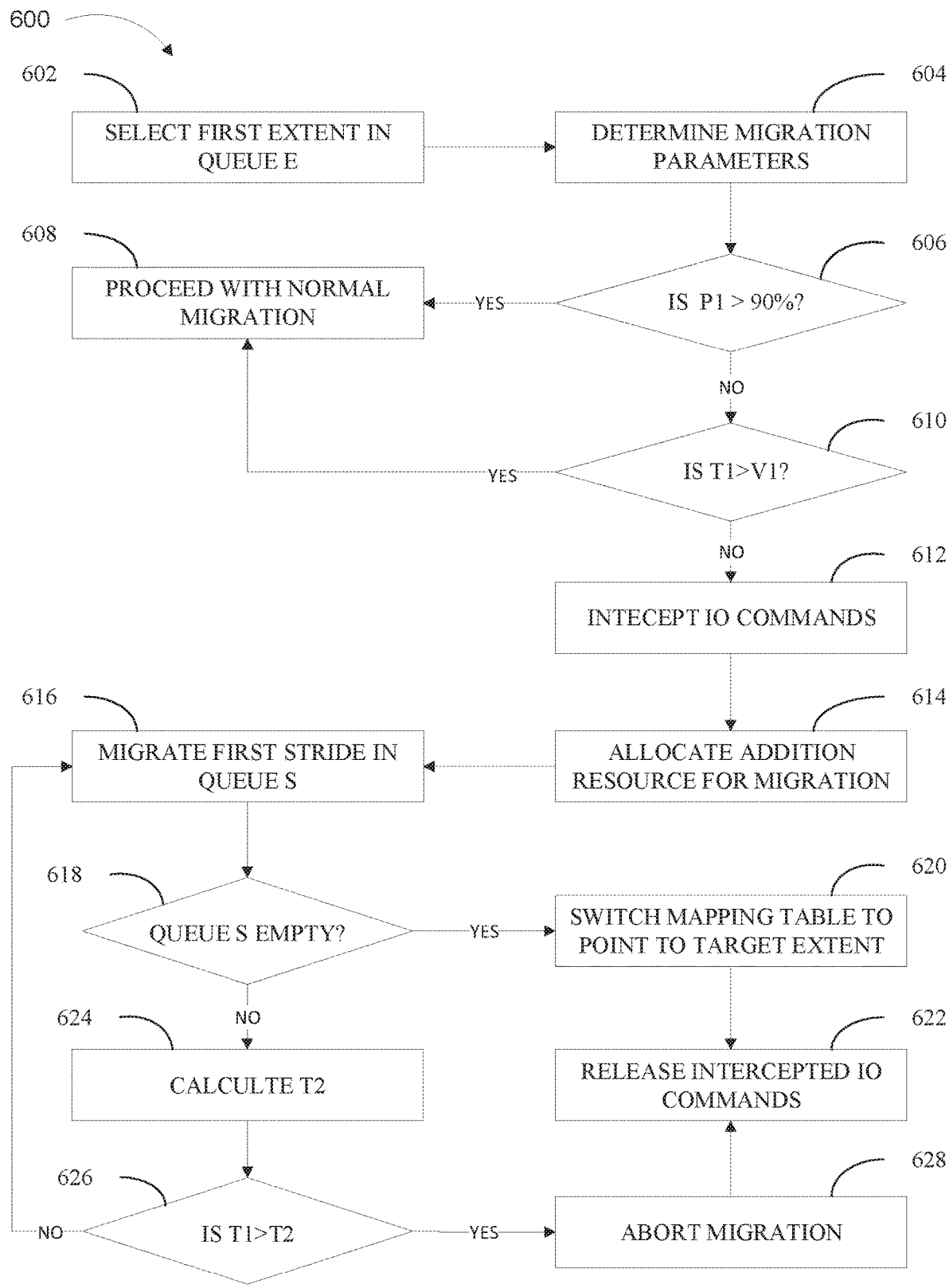
FIG. 6 is flowchart depicting an example method of intercepting IO commands in accordance with some embodiments of the present disclosure.

FIG. 6 depicts a flowchart of an example method to increase the speed of extent migration by intercepting host IO system 106 commands. One or more of the advantages and improvements described above can be incorporated into FIG. 6 to increase the speed of extent migration consistent with some embodiments of the present disclosure.

Method 600 can include more or fewer operations than those operations that are depicted. Method 600 can include operations in different orders than those orders depicted. Likewise, the method 600 can include operations that occur simultaneously rather than sequentially. Many modifications to the depicted method may be made by those skilled in the art without departing from the spirit and scope of the present disclosure. Method 600 can be implemented by one or more processors, migration manager 102, or host 104 of FIG. 1, or a different combination of hardware and/or software. In some embodiments, method 600 can be combined with method 200. In some embodiments, portions of method 600 and portions of methods 200, 300, 400, and/or 500 can be combined.

At operation 602, migration manager 102 selects the first extent in queue E. In some embodiments, queue E can be formed consistent with operation 202 of method 200. At operation 604 migration manager 102 determines migration parameters for the extent. In some embodiments, the parameters determined can be cache utilization percentage P1, estimated migration time T1 (or approximate migration time), and host IO timeout value V1. In some embodiments, P1 can represent the percentage of the caches that are currently being utilized by host IO system 106. In some embodiments, P1 can be obtained from IO statistics manager 108. The higher the utilization, the more difficult it is to halt normal operations.

In some embodiments, T1 can represent the approximate time it can take to migrate an extent from source tier 120 to target tier 122. In some embodiments, T1 is calculated by dividing the size of the extent by the bandwidth available for migration.

In some embodiments, V1 can represent the timeout value of host IO system 106. A timeout value can be a specified period of time that can elapse before a system takes a predetermined action designed to prevent excessive waiting. Timeout allow for more efficient usage of resources, by not allowing the system to wait indefinitely. In some embodiments host 104 will have a predetermined timeout value. In some embodiments, V1 is adjustable. In some embodiments, migration manager 102 can calculate V1 based on various system parameters.

At operation 606, migration manager 102 determines if P1 is greater than a threshold. In some embodiments, the threshold is tunable. In some embodiments, the threshold is a percentage (e.g. 90% utilization). In some embodiments, the threshold is dynamic and can be altered based on other system parameters. If P1 is greater than the threshold (decision tree "YES" branch), migration manager 102 proceeds to operation 608. At operation 608, migration manager 102 proceeds with normal migration (e.g. method 200, or no intercepting IO commands).

If P1 is less than the threshold (decision tree "NO" branch), migration manager 102 proceeds with operation 610. At operation 610, migration manager 102 determines if T1 is greater than V1. If T1 is greater than V1 (decision tree "YES" branch), migration manager 102 proceeds to operation 608 as described above.

If T1 is less than V1 (decision tree "NO" branch), migration manager 102 proceeds to operation 612. At operation 612, migration manager 102 intercepts IO commands. In some embodiments, migration manager 102 uses IO interceptor 110 to intercept the commands. In some embodiments, all the intercepted commands are stored in the order in which they are intercepted.

At operation 614, migration manager 102 allocates additional resources for migrating the extent. In some embodiments, the additional resources can be additional copier threads. In some embodiments, the additional resources can be space in primary cache 112 to facilitate copying, in addition to migration cache 114. In some embodiments, the additional resources can be derived from the system not processing the intercepted IO commands.

At operation 616, migration manager 102 migrates the first stride in queue S to target extent 126. In some embodiments, operation 616 may be consistent with operation 210 of FIG. 2. At operation 618, migration manager 102 determines if queue S is empty. If queue S is empty (decision tree "YES" branch), migration manager 102 proceeds to operation 620. At operation 620, migration manager 102 switches the mapping table to point to the target extent. In some embodiments, operation 620 can be consistent with operation 214 of method 200. In some embodiments, operation 622 can include releasing source extent 124 consistent with operation 220 of method 200. At operation 622, migration manager 102 releases intercepted IO commands. In some embodiments, the intercepted 10 commands are released by IO interceptor 110.

Returning to operation 618, if queue S is not empty (decision tree "NO" branch), migration manager 102 proceeds to operation 624. At operation 624, migration manager 102 calculates a migration timeout value, T2. The migration timeout value can represent an amount of time that the overall system will be disadvantaged if the IO commands are temporarily intercepted. In some embodiments, T2 is equal to the sum of T1 and V1 divided by 2. $T2=(T1+V1)/2$. In some embodiments, migration timeout value can be an amount of time in which the migration manager 102 should complete migration of the extent before the system releases the intercepted IO commands.

At operation 626, migration manager 102 determines if T1 is greater than T2. If T1 is grater than T2 (decision tree "YES" branch), migration manager 102 proceed to operation 628. At operation 628, migration manager 102 aborts the migration. In some embodiments, aborting the migration can be to reduce the additional resources allocated in operation 614. In some embodiments, aborting migration can be to restart the migration process. In some embodiments, aborting the migration can mean return to a standard migration (e.g. method 200), In some embodiments, aborting migration can include proceeding to operation 622. After the migration has been completed, migration manager 102 proceeds to operation 622, and releases the intercepted IO commands as described above.

Returning to operation 626, if migration manager 102 determines T1 is less than T2 (decisions tree "NO" branch), migration manager 102 returns to operation 616.

Figure 7:
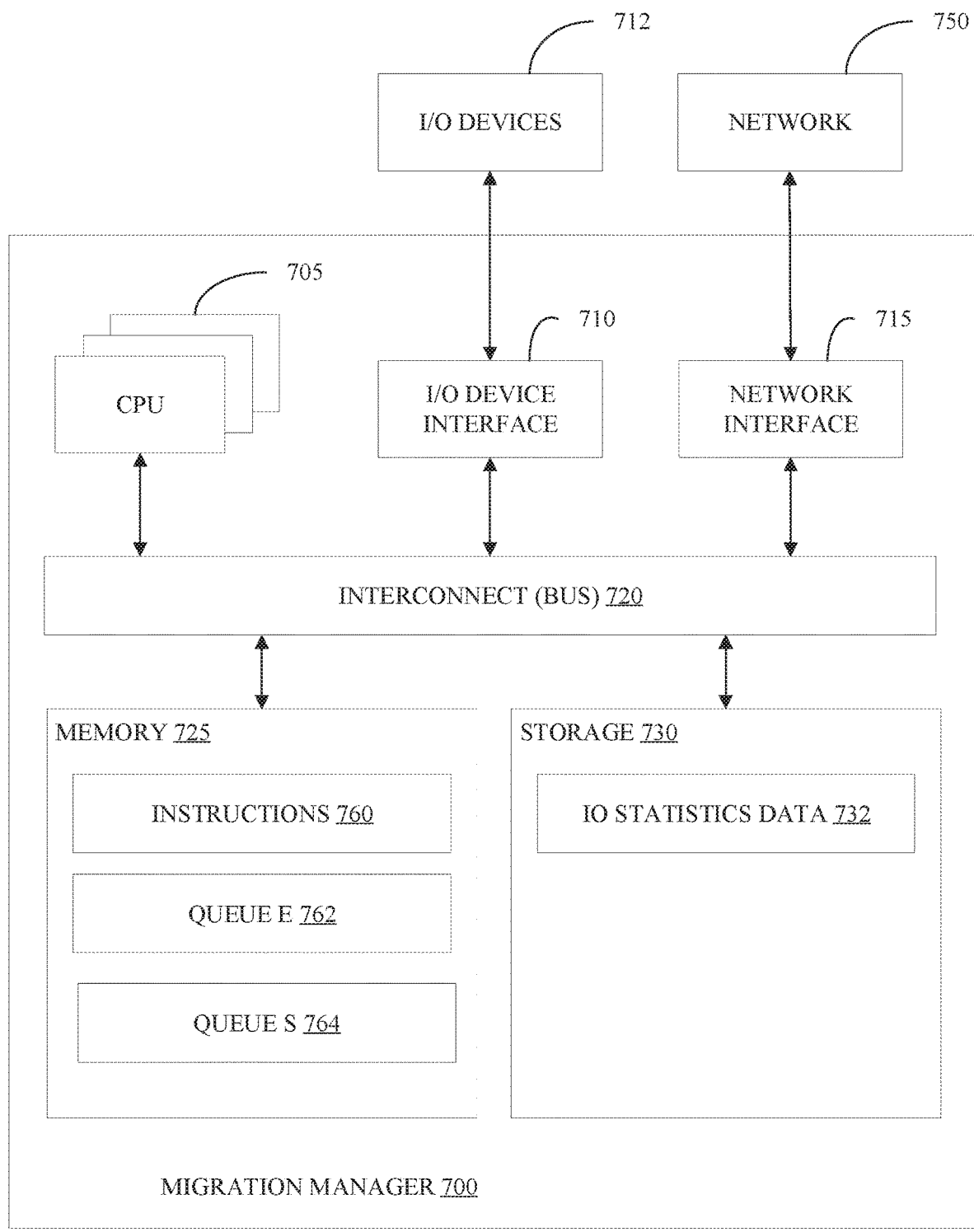
FIG. 7 illustrates a block diagram of an example migration manager in accordance with some embodiments of the present disclosure.
Figure 8:
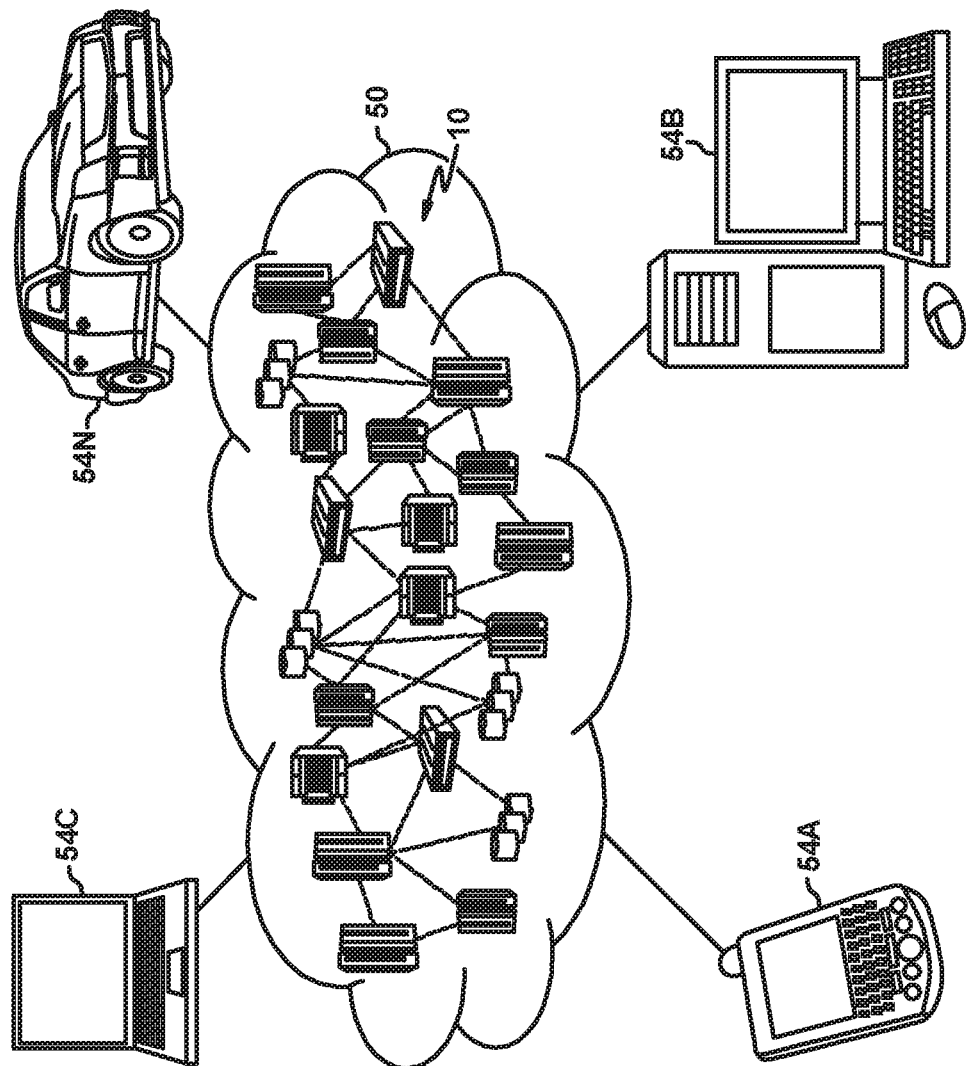
FIG. 8 depicts a cloud computing environment in accordance with some embodiments of the present disclosure.

FIG. 7 illustrates a block diagram of an example migration manager 700 (e.g., migration manager 102) in accordance with some embodiments of the present disclosure. In some embodiments migration manager 700 can perform the method 200, 300, 400, 500 and/or 600 as described in FIGS. 2-6. In some embodiments, migration manager 700 provides instructions for any of the methods 200, 300, 400, 500 and/or 600 of FIGS. 2-6. To a client machine such that the client machine executes the method, or a portion of the method, based on the instructions provided by the migration manager 700.

The migration manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or storage 730. The interconnect 720 is used to move data, such as programming instruction, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in some embodiments. In some embodiments, a CPU 705 can be a digital signal processor (DSP). In some embodiments, CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP CPU configurations). Memory 725 is generally included to be representative of a nonvolatile memory, such as a hard disk drive, solid state device (SSD), removable memory cards, optical storage, or flash memory devices. In an alternative embodiment, the storage 730 can be replaced by storage area-network (SAN) deices, the cloud, or other devices connected to the migration manager 700 via the I/O device interface 710 or a network 750 via the network interface 715.

In some embodiments, the memory 725 stores instruction 760 and the storage 730 stores IO statistics data 732. However, in some embodiments, the instructions 760, queue E 762, and queue S 764 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all of, any of the methods 200, 300, 400, 500, and/or 600 of FIGS. 2-6.

Queue E 762 can be a queue of extents that are marked for migration from source tier 118 to target tier 122. Queue S 764 can be a queue of strides from an extent currently being migrated from source extent 124, to target extent 126.

In some embodiments, the I/O devices 712 include an interface capable of presenting information and receiving input. For example, I/O device 712 can present information to a user interacting with migration manager 700 and receive input from the user. I/O devices of FIG. 7 refer interfacing with components outside of a computing device, and are different than IO component such as host IO system 106.

Migration manger 700 is connected to the network 750 via the network interface 715. Network 750 can comprise a physical, wireless, cellular, or different network.

Embodiments of the present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instruction can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instruction can also be stored in a computer readable storage medium that can direct a computer, a programmable data processing apparatus, and/or other devices to function in a particular manner, such that the computer readable storage medium having instructions stored therein comprises an article of manufacture including instructions which implement aspect of the function/act specified in the flowchart and/or block diagram block or blocks.

The computer readable program instruction can also be loaded onto a computer, other programmable data processing apparatus, or other device to cause a series of operations steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present disclosure. In this regard, each block in the flowchart or block diagrams can represent a module, segment, or subset of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present disclosure can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
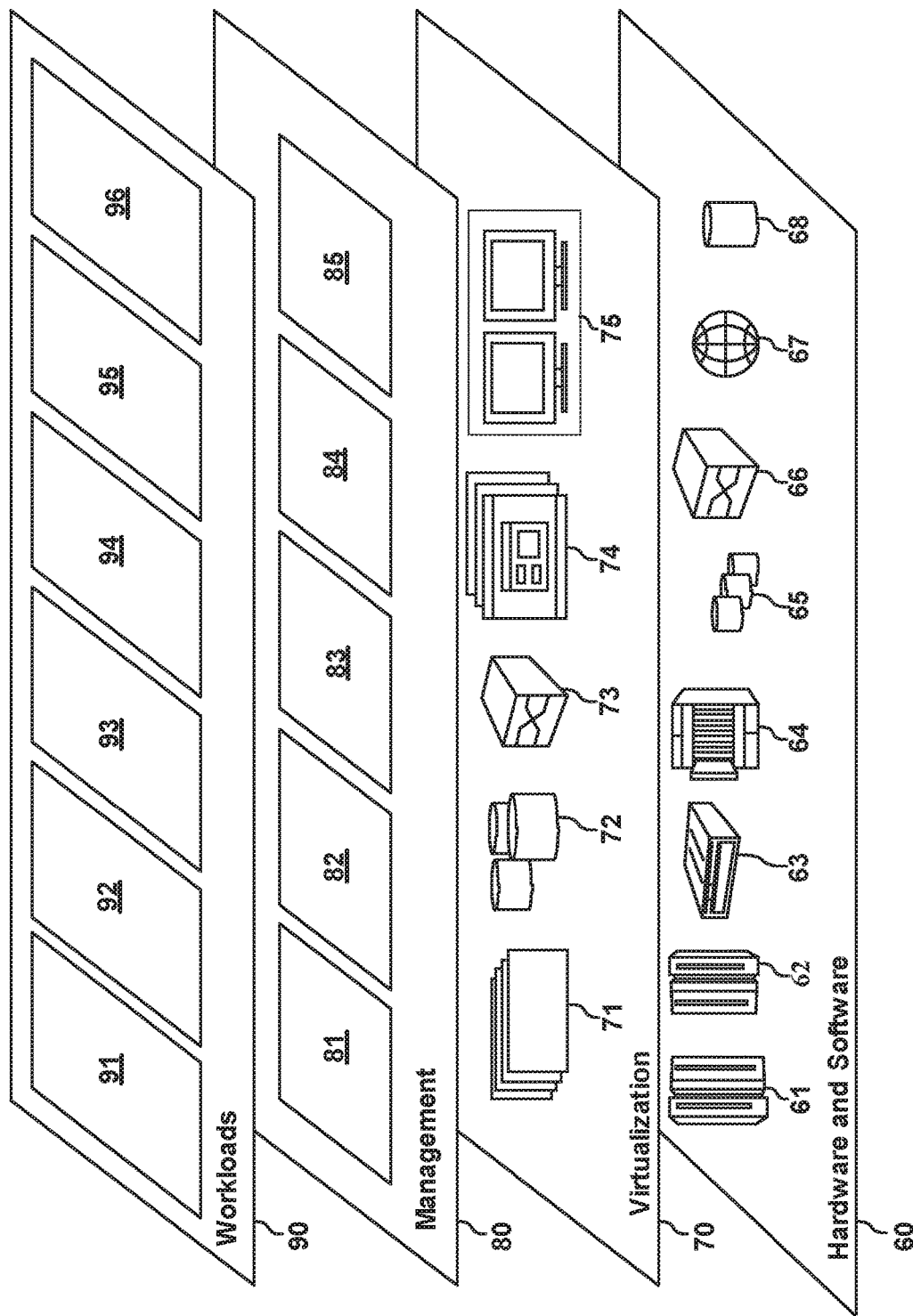
FIG. 9 depicts abstraction model layers in accordance with some embodiments of the present disclosure.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and extent migration 96.

What is claimed is:

1. A method comprising:
   determining a plurality of extents to migrate, wherein the plurality of extents are stored in a source tier, wherein each extent occupies an area of the source tier, and wherein the source tier is a first tier of a tiered storage;
   forming a first queue, wherein the first queue contains the plurality of extents;
   selecting a first extent from the first queue, wherein the first extent occupies a first area of the source tier;
   copying the first extent to a target tier, wherein the first extent will be copied to a first area of the target tier, wherein the target tier is a second tier of the tiered storage, the copying further comprising:
      dividing the first extent into a plurality of strides, wherein each stride is equal volume;
      forming a second queue, wherein the second queue contains the plurality of strides;
      selecting a first stride from the second queue;

copying the first stride from the source tier to the target tier; and
removing the first stride from the second queue;
changing a volume mapping table to point to the target tier for the first extent;
removing the first extent from the first queue; and
releasing the first area of the first tier.

2. The method of claim 1, further comprising:
obtaining a utilization percentage;
calculating an estimated migration time for the first extent;
obtaining a host timeout value;
intercepting, based on the utilization percentage being below a utilization threshold and the estimated migration time being less than the host timeout value, a set of IO system commands; and
releasing, in response to the plurality of strides being copied out of the second queue, the IO system commands.

3. The method of claim 2, further comprising:
allocating additional resources to assist the migration of the first extent.

4. The method of claim 2, wherein the utilization percentage is a ratio of an amount of cache storage that is in use in a total cache storage.

5. The method of claim 2, further comprising:
calculating a migration timeout value;
comparing the migration timeout value to the host timeout value; and
aborting the migration, in response to the migration timeout value being larger than the host timeout value, wherein aborting comprises releasing the IO system commands.

6. The method of claim 5, wherein the migration timeout value is an average of the host timeout value and the estimated migration time.

7. The method of claim 1, further comprising:
selecting a second extent from the first queue, wherein the second extent occupies a second area of the source tier;
copying the second extent to the target tier, wherein the second extent is copied to a second area of the target tier;
changing the volume mapping table to point to the target tier for the second extent;
removing the second extent from the first queue; and
releasing the second area of the first tier.

8. The method of claim 1, further comprising:
determining a number of tracks for each of the plurality of extents stored in a primary cache, wherein the first extent is selected based on having the number of tracks in the primary cache being lower than the remaining plurality of extents.

9. The method of claim 8, further comprising:
sorting the plurality of extents in the first queue, wherein the plurality of extents are arranged based on a number of tracks in each of the plurality of extents.

10. A system comprising:
a processor; and
a computer-readable storage medium communicatively coupled to the processor and storing program instructions which, when executed by the processor, are configured to cause the processor to perform a method comprising:
determining a plurality of extents to migrate, wherein the plurality of extents are stored in a source tier, wherein each extent occupies an area of the source tier, and wherein the source tier is a first tier of a tiered storage;
forming a first queue, wherein the first queue contains the plurality of extents;
selecting a first extent from the first queue, wherein the first extent occupies a first area of the source tier;
copying the first extent to a target tier, wherein the first extent will be copied to a first area of the target tier, wherein the target tier is a second tier of the tiered storage, the copying further comprising:
dividing the first extent into a plurality of strides, wherein each stride is equal volume;
forming a second queue, wherein the second queue contains the plurality of strides;
selecting a first stride from the second queue;
copying the first stride from the source tier to the target tier; and
removing the first stride from the second queue;
changing a volume mapping table to point to the target tier for the first extent;
removing the first extent from the first queue; and
releasing the first area of the first tier.

11. The system of claim 10, wherein the program instructions are further configured to cause the processor to perform a method further comprising:
obtaining a utilization percentage;
calculating an estimated migration time for the first extent;
obtaining a host timeout value;
intercepting, based on the utilization percentage being below a utilization threshold and the estimated migration time being less than the host timeout value, a set of IO system commands; and
releasing, in response to the plurality of strides being copied out of the second queue, the IO system commands.

12. The system of claim 11, wherein the program instructions are further configured to cause the processor to perform a method further comprising:
allocating additional resources to assist the migration of the first extent.

13. The system of claim 11, wherein the utilization percentage is the utilization of a primary cache.

14. The system of claim 11, wherein the program instructions are further configured to cause the processor to perform a method further comprising:
calculating a migration timeout value;
comparing the migration timeout value to the host timeout value; and
aborting the migration, in response to the migration timeout value being larger than the host timeout value, wherein aborting comprises releasing the IO system commands.

15. The system of claim 14, wherein the migration timeout value is an average of the host timeout value and the estimated migration time.

16. A computer program product, the computer program product comprising a computer readable storage medium having program instructions embodied therewith, the program instructions executable by a processing unit to cause the processing unit to perform a method comprising:
determining a plurality of extents to migrate, wherein the plurality of extents are stored in a source tier, wherein each extent occupies an area of the source tier, and wherein the source tier is a first tier of a tiered storage;

forming a first queue, wherein the first queue contains the plurality of extents;
selecting a first extent from the first queue, wherein the first extent occupies a first area of the source tier;
copying the first extent to a target tier, wherein the first extent will be copied to a first area of the target tier, wherein the target tier is a second tier of the tiered storage, the copying further comprising:
    dividing the first extent into a plurality of strides, wherein each stride is equal volume;
    forming a second queue, wherein the second queue contains the plurality of strides;
    selecting a first stride from the second queue;
    copying the first stride from the source tier to the target tier; and
    removing the first stride from the second queue;
changing a volume mapping table to point to the target tier for the first extent;
removing the first extent from the first queue; and
releasing the first area of the first tier.

17. The computer program product of claim of claim 16, wherein the program instructions are further configured to cause the processing unit to perform a method further comprising:
    obtaining a utilization percentage;
    calculating an estimated migration time for the first extent;
    obtaining a host timeout value;
    intercepting, based on the utilization percentage being below a utilization threshold and the estimated migration time being less than the host timeout value, a set of IO system commands; and
    releasing, in response to the plurality of strides being copied out of the second queue, the IO system commands.

18. The computer program product of claim 17, wherein the program instructions are further configured to cause the processing unit to perform a method further comprising:
    allocating additional resources to assist the migration of the first extent.

19. The computer program product of claim 17, wherein the utilization percentage is the utilization of a primary cache.

20. The computer program product of claim 17, wherein the program instructions are further configured to cause the processing unit to perform a method further comprising:
    calculating a migration timeout value;
    comparing the migration timeout value to the host timeout value; and
    aborting the migration, in response to the migration timeout value being larger than the host timeout value, wherein aborting comprises releasing the IO system commands.

\* \* \* \* \*